United States Patent
Karl

(12) 
(10) Patent No.: US 6,202,430 B1
(45) Date of Patent: Mar. 20, 2001

(54) METHOD AND APPARATUS FOR DETECTING EXCESSIVE PRESSURE IN A REFRIGERANT FLUID IN THE CONDENSER OF AN AIR CONDITIONING AND HEATING INSTALLATION

(75) Inventor: Stefan Karl, Paris (FR)

(73) Assignee: Valeo Climatisation, la Verriere (FR)

( * ) Notice: Subject to any disclaimer, the term of this patent is extended or adjusted under 35 U.S.C. 154(b) by 0 days.

(21) Appl. No.: 09/124,738

(22) Filed: Jul. 29, 1998

(30) Foreign Application Priority Data

Aug. 1, 1997 (FR) .................................................. 97 09897

(51) Int. Cl.[7] .................................................. B60H 1/00
(52) U.S. Cl. ........................... 62/184; 62/159; 62/DIG. 17
(58) Field of Search ..................... 62/159, 196.4, 62/181, 183, 184, DIG. 17; 237/213

(56) References Cited

U.S. PATENT DOCUMENTS

| | | | |
|---|---|---|---|
| 4,582,124 | 4/1986 | Yoshimi et al. | 165/28 |
| 5,291,941 | 3/1994 | Enomoto et al. | 165/62 |
| 5,316,074 | 5/1994 | Isaji et al. | 165/43 |
| 5,483,805 | 1/1996 | Fujii et al. | 62/158 |
| 5,537,831 | 7/1996 | Isaji et al. | 62/228.4 |
| 5,706,664 | * 1/1998 | Hara | 62/159 |

FOREIGN PATENT DOCUMENTS

| | | |
|---|---|---|
| 2 717 126 | 9/1995 | (FR) . |
| 2 731 952 | 9/1996 | (FR) . |

* cited by examiner

Primary Examiner—Harry B. Tanner
(74) Attorney, Agent, or Firm—Morgan & Finnegan, L.L.P.

(57) ABSTRACT

In a heating and air conditioning installation for a motor vehicle, the refrigerant fluid circuit includes a cooling (air conditioning) loop including a condenser, and a heating loop. In order to detect excess pressure in the refrigerant fluid in the condenser, during corrective discharges of the fluid to the condenser from the heating loop, the frequency of occurrence of these discharges is monitored continuously, and an evaluation is made as to whether the measured frequency exceeds a threshold value. The outlet pressure of the compressor is also monitored continuously, an evaluation being made as to whether the measured pressure exceeds a predetermined demand pressure by an excess value over a given period of time.

12 Claims, 2 Drawing Sheets

METHOD AND APPARATUS FOR DETECTING EXCESSIVE PRESSURE IN A REFRIGERANT FLUID IN THE CONDENSER OF AN AIR CONDITIONING AND HEATING INSTALLATION

FIELD OF THE INVENTION

This invention relates to a method of detecting excessive pressure in a refrigerant fluid in a condenser of an air conditioning loop in the fluid circuit of a dual-mode air conditioning and heating installation, during discharges of the fluid to the condenser from a heating loop of the same circuit, a compressor being provided for driving the fluid in the circuit.

BACKGROUND OF THE INVENTION

In a conventional dual-mode (heating and air conditioning) circuit, when the pressure of the refrigerant fluid in the condenser reaches the same value as the pressure of the fluid at the outlet of the compressor, the momentary discharges of fluid from the heating loop, intended to control pressure in the loop, are no longer effective to reduce the compressor outlet pressure. As a result, the pressures prevailing at the suction and delivery sides of the compressor will increase without it being possible to reduce them. This leads to a runaway situation such that the maximum safe pressures in the loop of the circuit are quickly reached.

Such a situation can be found in particular in a circuit of a heating and air conditioning apparatus for the cabin of a vehicle, of the general kind described in French patent specifications FR 2 717 126A and 2 731 952A. These circuits comprise a first branch containing an evaporator followed by the compressor, a second branch containing the condenser and a third branch containing no condenser. The second and third branches are arranged in parallel with each other so as to constitute, with the first branch, a cooling loop and a heating loop respectively. Switching means are provided for sending the fluid leaving the first branch selectively into the second branch or into the third branch. The heating and air conditioning apparatus further includes means for passing into the cabin air which has undergone heat exchange with the evaporator.

When the fluid is flowing in the cooling loop, the dual-mode circuit operates as a conventional air conditioning circuit. When the fluid is flowing in the heating loop, the evaporator is used as a heat exchanger for heating the cabin, with the fluid normally remaining in the gaseous state: this is the heating mode.

In a circuit of the above type, switching means are provided, typically comprising one or more discharge valves, for discharging fluid to the condenser from the heating loop. This enables the circuit to pass momentarily from the configuration of the heating loop to the configuration of the air conditioning loop so that the compressor can discharge fluid into the condenser, thereby reducing the mass of fluid in circulation once the configuration corresponding to the heating loop has been restored.

In such discharges, the pressure of the refrigerant fluid in the condenser can exceed safety limits, or other limits appropriate to correct operation in the loop.

DISCUSSION OF THE INVENTION

An object of the invention is to detect excessive pressure in the refrigerant fluid in the condenser, without calling for special sensors which would increase the cost of the circuit.

The invention arises from the realisation that the increase in pressure in the refrigerant fluid in the condenser can be detected from information which is available in relation to the frequency of occurrence of the discharges and the outlet pressure of the compressor.

According to the invention in a first aspect, a method of detecting excessive pressure in a refrigerant fluid in a condenser of an air conditioning loop of a circuit, during discharges of the fluid to the condenser from a heating loop of the said circuit, a compressor being provided for driving the fluid in the circuit, is characterised by the following operations:

(a) the frequency of the discharges is continuously determined, and an evaluation is made as to whether the measured frequency exceeds a threshold frequency; and (b) the outlet pressure of the compressor is continuously determined, and an evaluation is made as to whether the measured pressure exceeds a regulation or demand pressure by a given excess value over a given period of time, whereby an excessive frequency in operation (a) and an excess pressure in operation (b) indicates that the pressure of the refrigerant fluid in the condenser is excessive.

The threshold frequency is preferably about 1 Hz.

Preferably, the excess value is about 3% and the period of time is about 20 seconds.

The value of the frequency of occurrence of the discharges is typically obtained by means of a control module which governs the discharges themselves.

Preferably, the pressure at the outlet of the compressor is determined by means of a pressure sensor which serves to regulate the pressure of the fluid in the heating mode.

According to a preferred feature of the invention, in the event of an excess pressure in the refrigerant fluid in the condenser, the condenser is ventilated by forced air ventilation for a period of time sufficient to reduce the pressure of the refrigerant fluid in the condenser. This ventilating time is preferably a function of the temperature of the outside air. The ventilation of the condenser is preferably obtained by control of a motorised fan unit associated with the condenser.

According to another preferred feature of the invention, where the circuit is that of an air conditioning apparatus for the cabin of a motor vehicle, the circuit including a first branch containing an evaporator followed by the said compressor, a second branch containing the said condenser, and a third branch containing no condenser, with the second and third branches being connected in parallel with each other in such a way as to constitute, with the first branch, a cooling loop and a heating loop respectively, switching means being provided for transmitting the fluid leaving the first branch selectively into the second branch or into the third branch, and the apparatus further including means for delivering into the cabin air which has undergone heat exchange with the evaporator, the condenser is ventilated when excessive pressure is detected in the refrigerant fluid in the condenser.

According to the invention in a second aspect, an apparatus for performing the method of the first aspect of the invention is characterised in that it includes: control means adapted to act on at least one discharge valve; a frequency sensor connected to the discharge valve or valves for detecting the frequencies of occurrences of the discharges; and a pressure sensor connected to the output of the compressor.

Preferably, the control means comprise a computer connected to the frequency sensor and the pressure sensor, and adapted to deliver a control signal to open the discharge valve or valves in the event of the threshold frequency and the demand pressure being exceeded.

The computer is preferably connected to a motorised fan unit associated with the condenser, for ventilating the latter.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
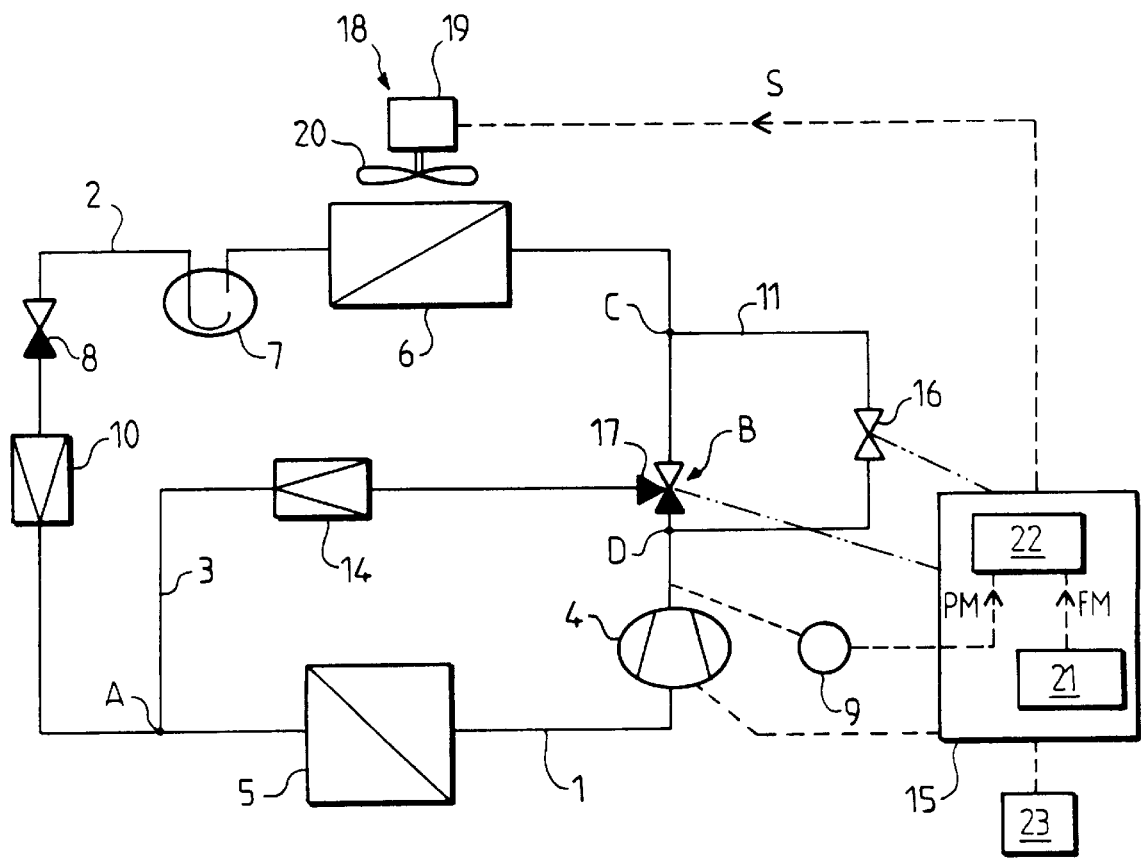
FIG. 1 is a diagram showing a refrigerant fluid circuit of an installation for air conditioning and heating the cabin of a vehicle, equipped with an apparatus according to the invention for detecting excessive pressure in the condenser of the circuit.

In the circuit of FIG. 1 there flows a refrigerant fluid which passes from the liquid state to the gaseous state by absorbing heat, and from the gaseous state to the liquid state by yielding heat, as is normally the case in air conditioning installations for vehicles. The components of the circuit are the usual ones which are found in such air conditioning installations.

The components of the circuit shown in FIG. 1 are arranged in three branches 1, 2 and 3 of the circuit, which are joined together at two junction points A and B. The branch 1 contains a compressor 4 which drives the fluid in the branch from the point A towards the point B, together with an evaporator 5 which is connected upstream of the compressor. The branch 2 contains, going from the point B towards the point A, a condenser 6, a bottle 7, a non-return valve 8 and an expansion device 10. A further expansion device 14 is connected in the branch 3. A pressure sensor 9 detects the pressure of the fluid at the outlet of the compressor. The three connections of a three-way valve 17, located at the point B, communicate with the branches 1, 2 and 3 respectively. A bypass duct 11 containing a discharge valve 16 connects a point D, situated downstream of the compressor in the branch 1, to a point C situated in the branch 2 between the three-way valve 17 and the condenser 6, so that the valve 16, when open, connects the two branches together, in parallel with (i.e. bypassing) the three-way valve 17. The valve 17 is controlled by a control module 15, so as to connect the downstream end of the branch 1 selectively to either the upstream end of the branch 2 or the upstream end of the branch 3.

During operation of the apparatus in a cooling (air conditioning) mode, the fluid delivered by the compressor passes through the point B, the valve 17 and the point C, so as to reach the condenser 6, in which it condenses, so yielding heat to the ambient air. The fluid then passes through the bottle 7 and the non-return valve 8, and is expanded in the thermostatic expansion device 10. The fluid then evaporates in the evaporator 5, cooling the air which is to be passed into the cabin of the vehicle. The gaseous fluid leaving the evaporator 5 is once more aspirated by the compressor.

In the heating mode, the fluid flows in the heating loop constituted by the branches 1 and 3. On leaving the compressor 4, it passes through the point D and the valve 17, and then into the expansion device 14, to reach the evaporator 5 while remaining in the gaseous state. In the evaporator 5, it yields heat to the air which is to be passed into the cabin. The fluid then returns to the compressor.

The control module 15 governs opening of the discharge valve 16 in such a way that the circuit thereby passes momentarily from the heating mode to the cooling (air conditioning) mode, so enabling the compressor 4 to release fluid into the condenser 6. This enables the mass of fluid in circulation to be reduced after return to the configuration corresponding to the heating mode.

As has been indicated above, it can happen that an excessive pressure in the refrigerant fluid occurs in the condenser in the course of these discharges of fluid to the condenser.

The condenser 6 is equipped with a motorised fan unit 18 consisting of a motor 19 and a fan rotor 20 driven by the motor, for ventilating the condenser 6 with a forced stream of air.

The control module 15 includes a frequency sensor 21 which serves to govern the discharge valve 16 in accordance with a defined law. The frequency sensor 21 is used in order to determine continuously the frequency of occurrence of the discharges, and thus to provide a value of measured frequency FM. The frequency sensor is connected to a computer 22 which receives a signal representing the measured frequency FM, and which determines whether the said measured frequency exceeds a threshold frequency FS which is fixed in advance.

In addition, the pressure sensor 9, which serves in particular to regulate the flow of the fluid in the cooling mode, enables the pressure PR at the outlet of the compressor to be continuously determined. The sensor 9 is connected to the computer 22, and passes to the latter a signal which represent the pressure PM measured at the outlet of the compressor. The computer 22 evaluates whether the measured pressure PM exceeds a regulation pressure, or demand pressure PC, by a given excess value TD over a given period T.

If the computer determines that an excessive frequency and an excess pressure exist at the same time, it passes a signal S to the motorised fan unit 18. The latter is started, which enables the condenser 6 to be ventilated, and therefore causes the pressure of the refrigerant fluid in the condenser to be reduced.

In this example, the threshold frequency FS is about 1 Hz, the excess value TD is about 3%, and the time period T is at least 20 seconds.

The motorised fan unit 18 ventilates the condenser for a period of time sufficient to return the pressure in the condenser to an appropriate value. This ventilation time is a function of the outside temperature, detected by a temperature sensor 23.

Figure 2:
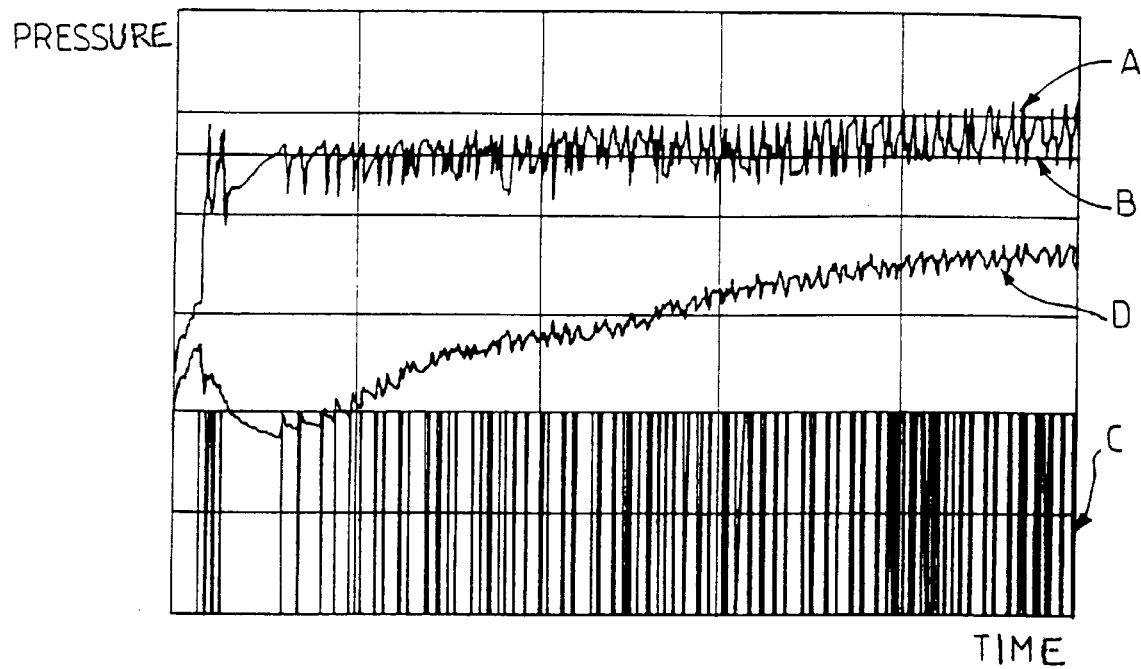
FIG. 2 is a diagram showing the variation over time of the outlet pressure of the compressor and the frequency of discharges in the event of elevation of the pressure of the condenser.

Reference is now made to the diagram in FIG. 2, on which are shown, in arbitrary units, the variations in the outlet pressure PR of the compressor (curve A) with respect to a demand pressure PC, also referred to as the regulation pressure (line B). The pressure in the condenser is represented by the curve D, while the discharge frequency is represented by the curve C. The diagram shows that the frequency of the discharges (curve C) increases so as to exceed a threshold frequency, and that the pressure at the outlet of the compressor (curve A) increases to exceed the demand pressure by a given excess value, which in this example is 3%, and over a given period of time which in this example is at least 20 seconds.

Figure 3:
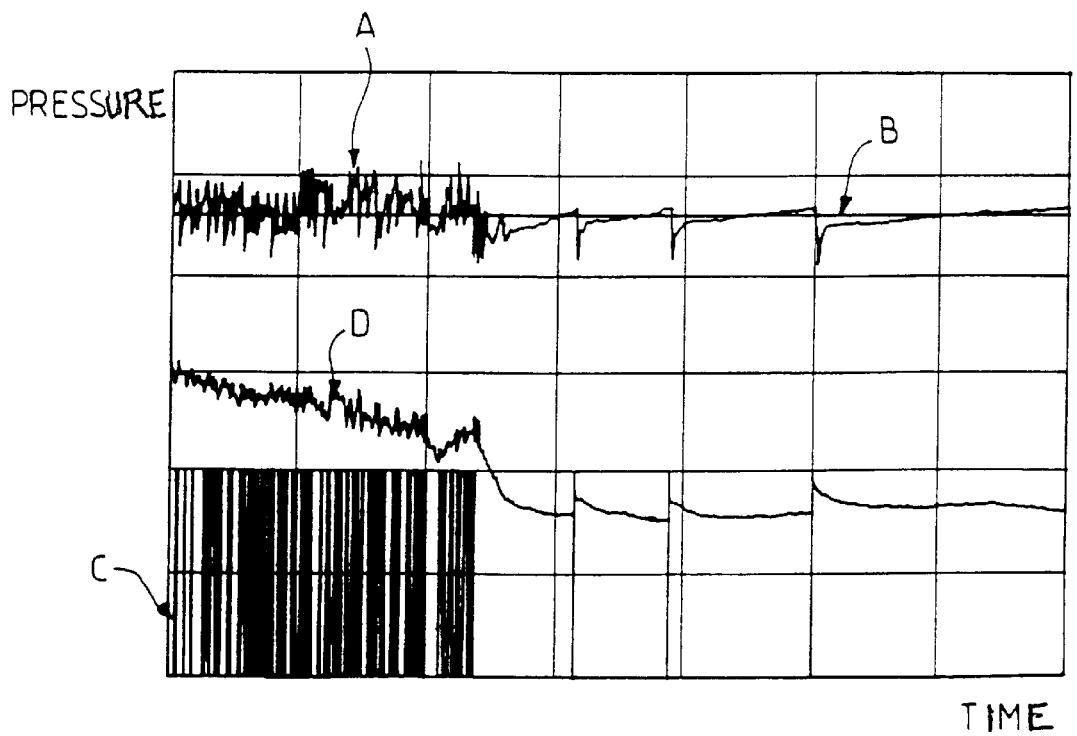
FIG. 3 is a similar diagram showing variations in compressor outlet pressure and discharge frequency when the motorised fan unit associated with the condenser of the circuit is energised.

When the computer detects that the discharges are occurring with excessive frequency, and that the compressor outlet pressure is excessive, it actuates the motorised fan unit 18 as described above. As a result, as is shown in FIG. 3, the outlet pressure of the compressor is reduced, as is the frequency of the discharges. Thus, ventilation of the compressor 6 enables the loop to revert to safe operating conditions. If the frequency of the discharges increases once again, and the compressor outlet pressure also increases, the control module 15 does of course again start the motorised fan unit 18.

The use of the method according to the invention is not limited to the circuit described above and shown in FIG. 1, which is given purely by way of example.

What is claimed is:

1. In a fluid circuit defining a cooling loop and a heating loop for use in an air conditioning mode and a heating mode, respectively, of the circuit, the circuit including a condenser in the cooling loop, a compressor for driving a refrigerant fluid through the circuit, and means for effecting momentarily discharges of fluid from the heating loop to the condenser, a method of detecting excessive pressure in said fluid in the condenser during said discharges, the method comprising the steps of:
   (a) continuously measuring the frequency of occurrence of said discharges, and evaluating whether the said frequency is excessive in that it exceeds a threshold frequency; and
   (b) continuously measuring the pressure in said fluid at the outlet of the compressor, and evaluating whether the said pressure is excessive in that its measured value exceeds a predetermined demand pressure by an excess value during a given period of time,
   whereby the combination of said excessive frequency in operation (a) and said excessive pressure in operation (b) indicate that the pressure of the fluid in the condenser is excessive.

2. A method according to claim 1, wherein the threshold value is about 1 Hz.

3. A method according to claim 1, wherein the said excess value is about 3% and the said period is at least 20 seconds.

4. A method according to claim 1, when used in apparatus comprising the said circuit and a control module connected with the said circuit for controlling the said discharges, wherein in step (a), the frequency of the said discharges is measured from the said control module.

5. A method according to claim 1, when used in apparatus comprising a said circuit and a pressure sensor associated with the compressor for regulating flow of fluid in the heating mode, wherein in step (b), the pressure at the outlet of the compressor is measured by the said pressure sensor.

6. A method according to claim 1, further including the step, in the event of excess pressure occurring in the refrigerant fluid in the condenser, of ventilating the condenser by means of forced air for a period of time sufficient to reduce the pressure of the fluid in the condenser.

7. A method according to claim 6, further including the step of continuously measuring outside air temperature, the said period of time being a function of the outside air temperature.

8. A method according to claim 6, when used in said apparatus further including a motorised fan unit associated with the condenser, wherein the ventilation of the condenser is effected by the motorised fan unit.

9. A method according to claim 1, when used in apparatus for air conditioning the cabin of a motor vehicle, the circuit comprising a first branch, a second branch and a third branch, an evaporator in the first branch, the compressor being connected in the first branch downstream of the evaporator, the condenser being connected in the second branch, and the third branch being used without any condenser, the second and third branches being connected in parallel with each other so that the cooling loop is defined by the first and second branches and the heating loop is defined by the first and third branches, the circuit further including switching means for passing said fluid leaving the first branch selectively into the second branch and the third branch, the apparatus further including means for delivering into a said cabin air that has undergone heat exchange with the evaporator, the method including the further step of ventilating the condenser when excessive pressure is detected in the fluid in the condenser.

10. Apparatus for performing a method according to claim 1, comprising a said circuit, the circuit further including at least one discharge valve for effecting said discharges, the apparatus further including control means adapted to act on said at least one discharge valve whereby to effect the said discharges, a frequency sensor associated with the said control means for detecting the frequencies of occurrence of the said discharges, and a pressure sensor connected to the outlet of the compressor and to the said control means.

11. Apparatus according to claim 10, wherein the control means further include a computer connected to the frequency sensor and pressure sensor and adapted to deliver a control signal in the event of the threshold frequency and the demand pressure being exceeded.

12. Apparatus according to claim 11, further including a motorized fan unit associated with the condenser, the computer being connected to the motorized fan unit whereby to deliver said control signal to actuate the fan unit.

* * * * *